US012645516B2

(12) United States Patent
Azaria et al.

(10) Patent No.: US 12,645,516 B2
(45) Date of Patent: Jun. 2, 2026

(54) APPLICATION PROGRAMMING INTERFACE (API) AND SITE DISCOVERY VIA REQUEST SIMILARITY

(71) Applicant: Imperva, Inc., San Mateo, CA (US)

(72) Inventors: Jonathan R. Azaria, Beit Gamliel (IL); Ori Nakar, Tel Aviv (IL); Matan Lion, Tel Aviv (IL)

(73) Assignee: Imperva, Inc., Austin, TX (US)

( * ) Notice: Subject to any disclaimer, the term of this patent is extended or adjusted under 35 U.S.C. 154(b) by 19 days.

(21) Appl. No.: 17/661,497

(22) Filed: Apr. 29, 2022

(65) Prior Publication Data

US 2022/0350686 A1 Nov. 3, 2022

Related U.S. Application Data

(60) Provisional application No. 63/182,740, filed on Apr. 30, 2021.

(51) Int. Cl.
*G06F 8/10* (2018.01)
*G06F 9/54* (2006.01)
*G06F 16/955* (2019.01)

(52) U.S. Cl.
CPC .......... *G06F 9/547* (2013.01); *G06F 16/9566* (2019.01)

(58) Field of Classification Search
CPC .............................. G06F 9/547; G06F 16/9566
See application file for complete search history.

(56) References Cited

U.S. PATENT DOCUMENTS

| | | | | |
|---|---|---|---|---|
| 7,712,111 B2 * | 5/2010 | Illowsky | ............... | G06F 9/5072 |
| | | | | 719/312 |
| 9,191,285 B1 * | 11/2015 | Isaacson | ............. | H04L 41/5009 |
| 9,571,512 B2 * | 2/2017 | Ray | ..................... | H04L 63/1425 |
| 10,447,708 B2 * | 10/2019 | Thomas | ................ | H04L 63/145 |
| 10,873,618 B1 * | 12/2020 | Mittal | ..................... | H04L 69/22 |
| 2012/0110174 A1 * | 5/2012 | Wootton | ............. | H04L 63/1416 |
| | | | | 709/224 |
| 2018/0196643 A1 * | 7/2018 | Dolby | ................... | H04L 67/025 |
| 2018/0367551 A1 * | 12/2018 | Muddu | ............... | G06F 3/04847 |
| 2020/0201666 A1 * | 6/2020 | Aron | ........................ | H04L 67/53 |
| 2021/0034431 A1 * | 2/2021 | Bar Oz | ................... | H04L 67/02 |
| 2021/0173688 A1 * | 6/2021 | Singhal | ............... | G06F 9/45558 |
| 2021/0211486 A1 * | 7/2021 | Mittal | ................... | G06F 16/221 |

OTHER PUBLICATIONS

Giannitsaros, D., "urlclustering," v. 0.4.1, MIT, Oct. 19, 2015, downloaded from https://pypi.org/project/urlclustering/#description, 6 pages.

* cited by examiner

*Primary Examiner* — Pierre Vital
*Assistant Examiner* — Abdou K Seye

(57) ABSTRACT

A method performed by one or more computing devices to discover endpoints of a web service. The method includes obtaining a plurality of web service requests, determining levels of similarities between pairs of web service requests, grouping the plurality of web service requests into a plurality of groups based on the levels of similarities, responsive to a determination that the URL paths of the web service requests included in a first group do not include a parameter, determining that each of the URL paths of the web service requests included in the first group refer to separate endpoints of the web service, and responsive to a determination that the URL paths of the web service requests included in a second group include a parameter, determining that the URL paths of the web service requests included in the second group refer to a single endpoint of the web service.

17 Claims, 11 Drawing Sheets

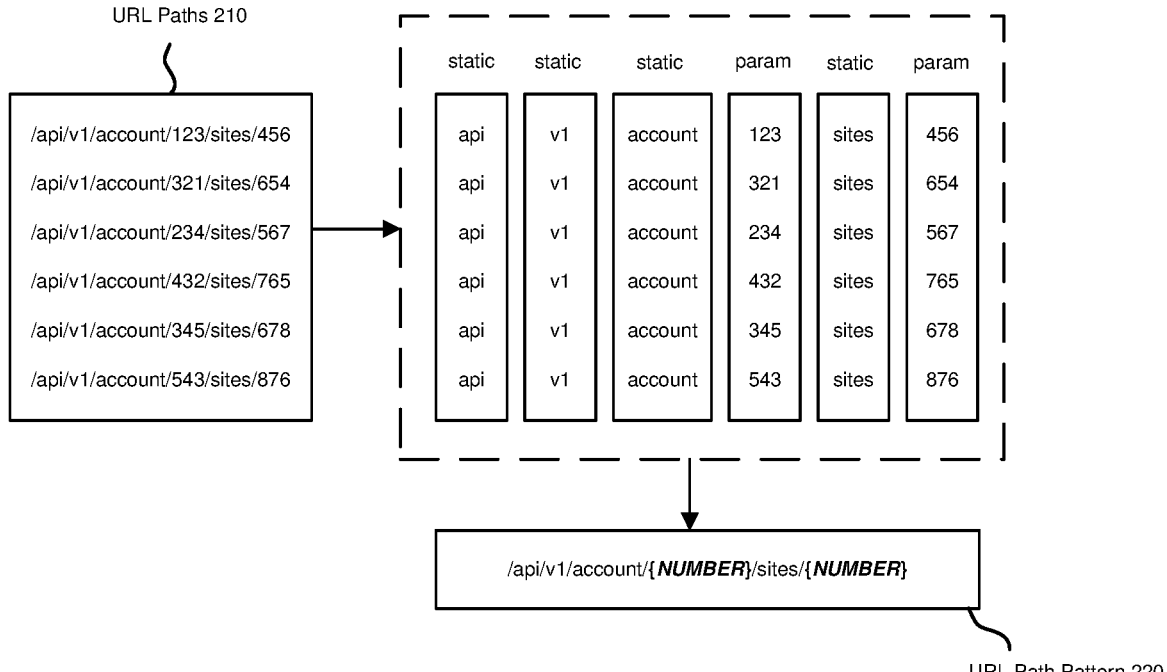

URL Paths 210

| | static | static | static | param | static | param |
|---|---|---|---|---|---|---|
| /api/v1/account/123/sites/456 | api | v1 | account | 123 | sites | 456 |
| /api/v1/account/321/sites/654 | api | v1 | account | 321 | sites | 654 |
| /api/v1/account/234/sites/567 | api | v1 | account | 234 | sites | 567 |
| /api/v1/account/432/sites/765 | api | v1 | account | 432 | sites | 765 |
| /api/v1/account/345/sites/678 | api | v1 | account | 345 | sites | 678 |
| /api/v1/account/543/sites/876 | api | v1 | account | 543 | sites | 876 |

/api/v1/account/{NUMBER}/sites/{NUMBER}

URL Path Pattern 220

Figure 2

URL path (hits)

/api/v1/sites/123 (1k)
/api/v1/sites/543/plan (7k)
/api/v1/sites/345/plan (10k)
/api/v1/sites/999 (2k)
/api/v1/sites/list (1k)
/api/v1/account/show (7k)
/api/v1/account/monthly (1k)

Root (29K)

api (29K)

v1 (29K)

Tree 310 sites (21K)

Merge:
"Numeric" (20K), plan (17K)

account (8K)

list (1K)

123 (1K)

543 (7K)

345 (10K)

999 (2K)

show (7K)

monthly (1K)

static plan (7K)

plan (10K)

parameter

URL path (hits)

/api/v1/sites/123 (1k)
/api/v1/sites/543/plan (7k)
/api/v1/sites/345/plan (10k)
/api/v1/sites/999 (2k)
/api/v1/sites/list (1k)
/api/v1/account/show (7k)
/api/v1/account/monthly (1k)

Pruned
Tree
320

Tree (29K)

api
(29K)

v1
(29K)

sites
(21K)

account
(8K)

list
(1K)

Numeric
(20K)

Merge:
"Numeric" (20K), plan (17K)

show
(7K)

monthly
(1K)

plan
(17K)

static

| | /api/v1/sites/1234 | /api/v1/sites/5436 | /api/v1/sites/3453 | /api/v1/sites/9999 | /api/v1/sites/list-all | /api/v1/account/show | /api/v1/account/monthly |
|---|---|---|---|---|---|---|---|
| /api/v1/sites/1234 | 1.00 | 0.875 | 0.875 | 0.875 | 0.75 | 0.625 | 0.50 |
| /api/v1/sites/5436 | 0.875 | 1.000 | 0.875 | 0.875 | 0.75 | 0.625 | 0.50 |
| /api/v1/sites/3453 | 0.875 | 0.875 | 1.000 | 0.875 | 0.75 | 0.625 | 0.50 |
| /api/v1/sites/9999 | 0.875 | 0.875 | 0.875 | 1.000 | 0.75 | 0.625 | 0.50 |
| /api/v1/sites/list-all | 0.875 | 0.875 | 0.875 | 0.875 | 1.00 | 0.500 | 0.50 |
| /api/v1/account/show | 0.625 | 0.625 | 0.625 | 0.625 | 0.50 | 1.000 | 0.75 |
| /api/v1/account/monthly | 0.625 | 0.625 | 0.625 | 0.625 | 0.50 | 0.750 | 1.000 |

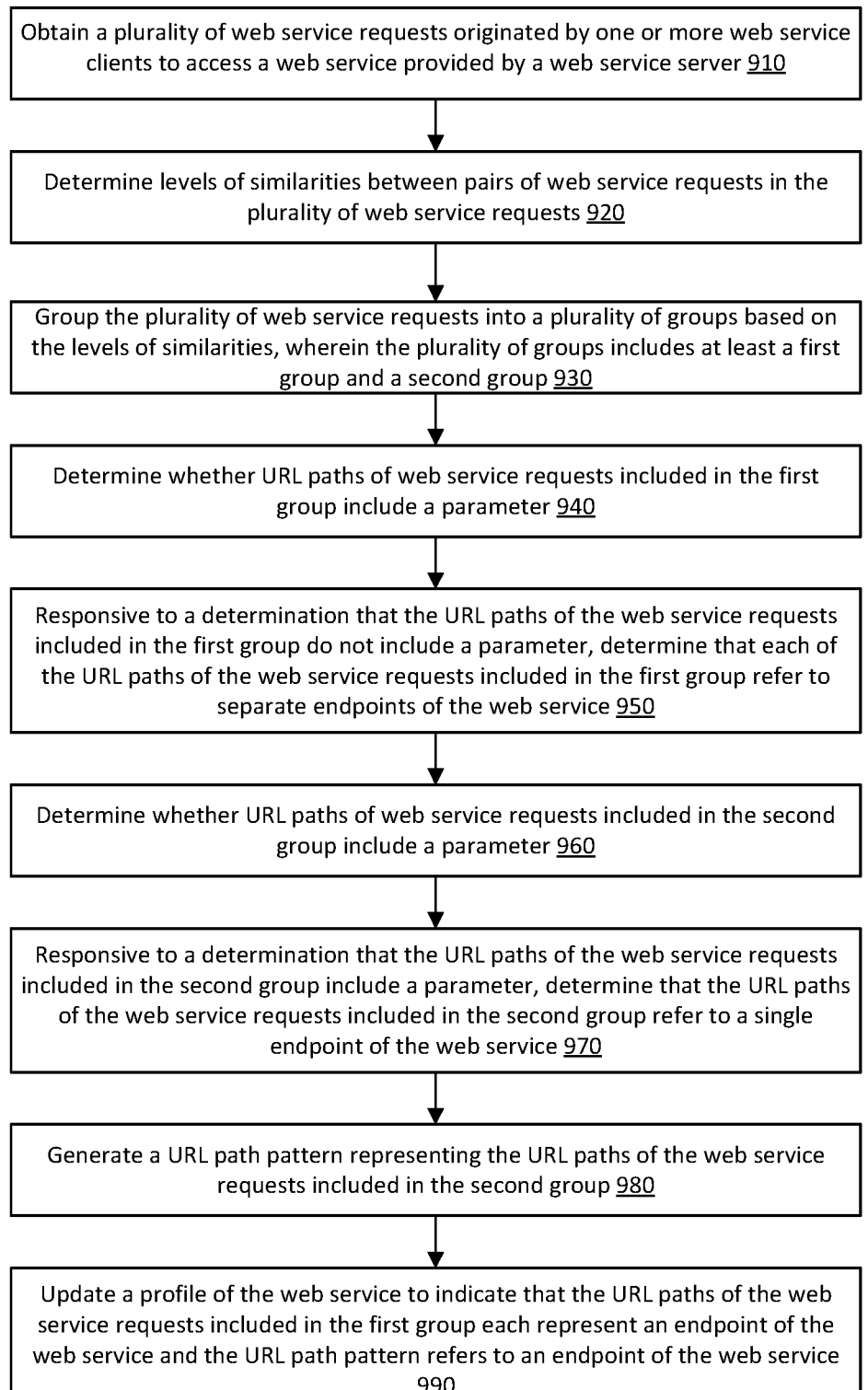

Obtain a plurality of web service requests originated by one or more web service clients to access a web service provided by a web service server 910

Determine levels of similarities between pairs of web service requests in the plurality of web service requests 920

Group the plurality of web service requests into a plurality of groups based on the levels of similarities, wherein the plurality of groups includes at least a first group and a second group 930

Determine whether URL paths of web service requests included in the first group include a parameter 940

Responsive to a determination that the URL paths of the web service requests included in the first group do not include a parameter, determine that each of the URL paths of the web service requests included in the first group refer to separate endpoints of the web service 950

Determine whether URL paths of web service requests included in the second group include a parameter 960

Responsive to a determination that the URL paths of the web service requests included in the second group include a parameter, determine that the URL paths of the web service requests included in the second group refer to a single endpoint of the web service 970

Generate a URL path pattern representing the URL paths of the web service requests included in the second group 980

Update a profile of the web service to indicate that the URL paths of the web service requests included in the first group each represent an endpoint of the web service and the URL path pattern refers to an endpoint of the web service 990

Figure 9

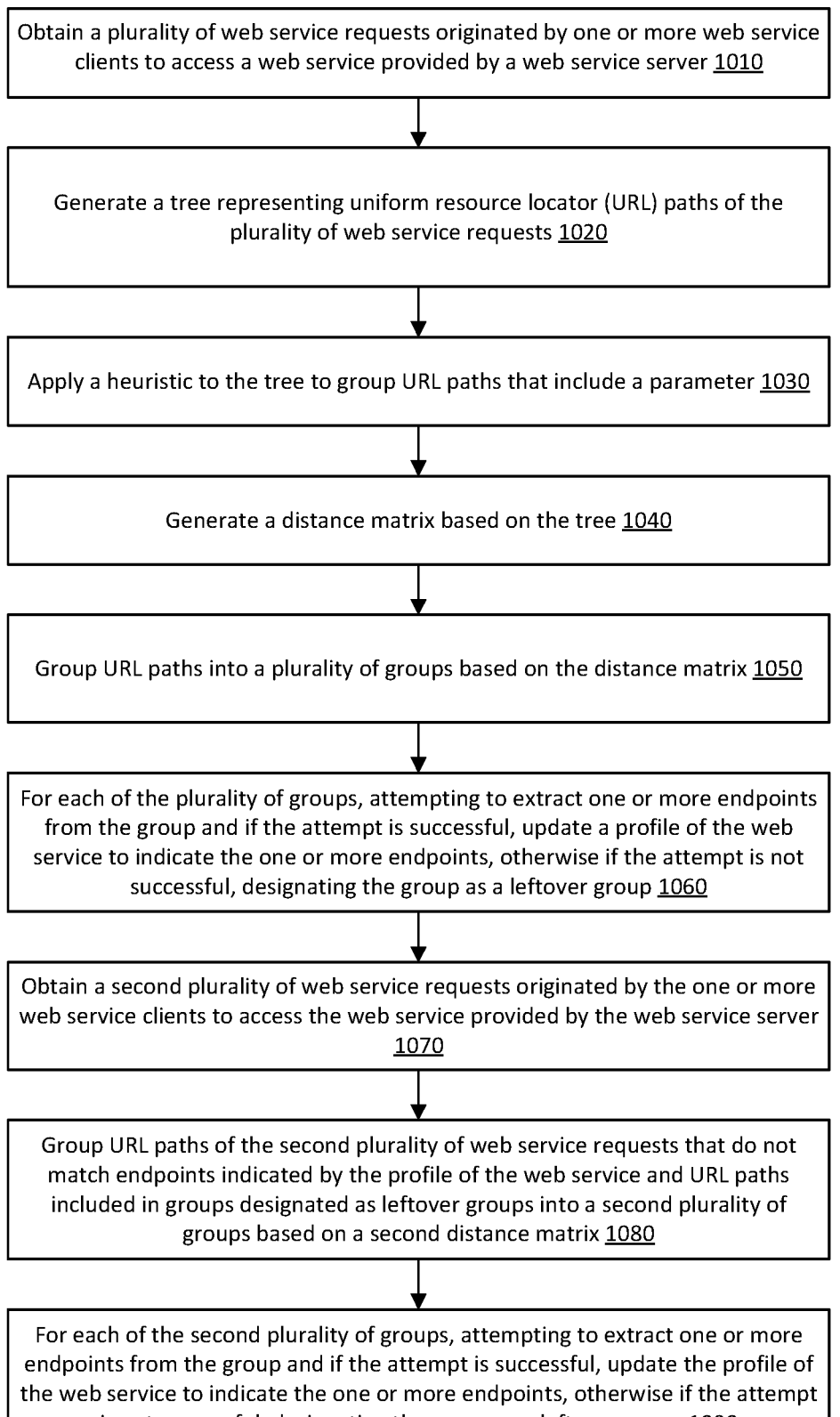

Obtain a plurality of web service requests originated by one or more web service clients to access a web service provided by a web service server 1010

Generate a tree representing uniform resource locator (URL) paths of the plurality of web service requests 1020

Apply a heuristic to the tree to group URL paths that include a parameter 1030

Generate a distance matrix based on the tree 1040

Group URL paths into a plurality of groups based on the distance matrix 1050

For each of the plurality of groups, attempting to extract one or more endpoints from the group and if the attempt is successful, update a profile of the web service to indicate the one or more endpoints, otherwise if the attempt is not successful, designating the group as a leftover group 1060

Obtain a second plurality of web service requests originated by the one or more web service clients to access the web service provided by the web service server 1070

Group URL paths of the second plurality of web service requests that do not match endpoints indicated by the profile of the web service and URL paths included in groups designated as leftover groups into a second plurality of groups based on a second distance matrix 1080

For each of the second plurality of groups, attempting to extract one or more endpoints from the group and if the attempt is successful, update the profile of the web service to indicate the one or more endpoints, otherwise if the attempt is not successful, designating the group as a leftover group 1090

Figure 10

APPLICATION PROGRAMMING INTERFACE (API) AND SITE DISCOVERY VIA REQUEST SIMILARITY

CROSS-REFERENCE TO RELATED APPLICATIONS

This application claims the benefit of U.S. Provisional Application No. 63/182,740 filed Apr. 30, 2021, which is hereby incorporated by reference.

TECHNICAL FIELD

Embodiments of the invention relate to the field of automated endpoint discovery of web services.

BACKGROUND

Discovering the endpoints of a web service (e.g., a web site or application programming interface (API)) without manual intervention is a difficult task particularly when the uniform resource locator (URL) paths of traffic to the web application contain path parameters and/or anomalies (e.g., malicious text added to a URL path by an attacker or invalid text added to a URL path by mistake).

Existing endpoint discovery solutions focus on making it easier to detect the endpoints of a web service by recording URL paths of traffic to the web service and suggesting possible hierarchies, but require manual intervention to complete the full cycle of endpoint discovery. One issue that existing endpoint discovery solutions struggle with is how to correctly detect parameters appearing in URL paths.

For example, consider an API that has the following endpoints, where {site_id} is a parameter:

/api/v1/sites/{site_id}
/api/v1/sites/list-all
/api/v1/account/profile

Simply recording the URL paths of all traffic to the API and designating all distinct URL paths to be endpoints of the API will not result in the correct outcome. For example, using this approach, the URL paths "/api/v1/sites/1234" and "/api/v1/sites/5436" would be designated as separate endpoints of the API even though they are actually referring to the same endpoint ("/api/v1/sites/{site_id}") but with different parameter values (values of "1234" and "5436" for the {site_id} parameter, respectively).

Naive endpoint discovery solutions that attempt to detect parameters in URL paths based on the existence of a common prefix will not work if a non-parameter appears in the same location as a parameter. For example, for the URL paths "/api/v1/sites/list-all", "/api/v1/sites/1234", and "/api/v1/sites/5436", since all of these URL paths have the same prefix, the last URL part will be marked as being a parameter even though this is not the case for the first URL path ("list-all" is a static value and not a value for a parameter).

Endpoint discovery solutions that use regular expressions to detect parameters in URL paths only work for simple parameter types such as dates, numbers, or universally unique identifiers (UUIDs), but do not work well for complex parameter types such as free text or base64 strings.

Furthermore, any anomalies appearing in the URL paths will interfere with the algorithm and produce incorrect results.

BRIEF DESCRIPTION OF THE DRAWINGS

The invention may best be understood by referring to the following description and accompanying drawings that are used to illustrate embodiments of the invention. In the drawings:

FIG. 2 is a diagram illustrating a URL path pattern representing a group of URL paths, according to some embodiments.

FIG. 9 is a flow diagram of a process for automatically discovering endpoints of a web service, according to some embodiments.

FIG. 10 is a flow diagram of a process for automatically discovering endpoints of a web service, according to some embodiments.

DETAILED DESCRIPTION

Figure 1:
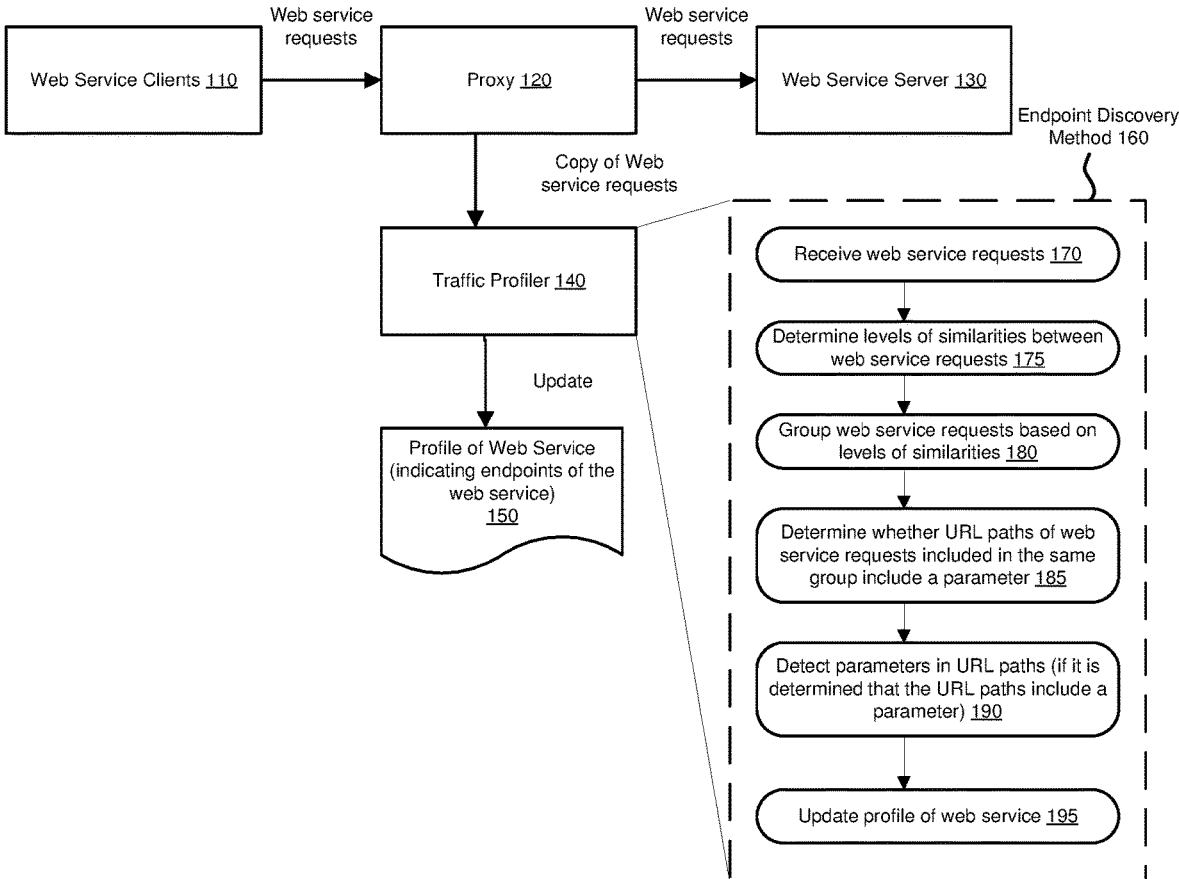
FIG. 1 is a block diagram of a system for performing automatic endpoint discovery, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims (or example embodiments), the terms "coupled" and "connected," along with their derivatives, may be used. It should be understood that these terms are not intended as synonyms for each other.

"Coupled" is used to indicate that two or more elements, which may or may not be in direct physical or electrical contact with each other, co-operate or interact with each other. "Connected" is used to indicate the establishment of communication between two or more elements that are coupled with each other As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As mentioned above, existing endpoint discovery solutions are not able to accurately discover the endpoints of a web service (and particularly when the uniform resource locator (URL) paths have parameters) without manual intervention. Embodiments disclosed herein are able to more accurately discover the endpoints of a web application compared to existing endpoint discovery solutions by determining levels of similarities between web service requests, grouping the web service requests into groups based on the levels of similarities, and determining whether URL paths of web service requests included in the same group include a parameter. If it is determined that the URL paths include a parameter, then the URL paths may be designated as referring to a single endpoint of the web service. Otherwise, if it is determined that the URL paths do not include a parameter, then each URL path may be designated as referring to a separate endpoint.

As used herein, a URL part is a component within a URL path that is delimited by a predefined character such as a forward slash ('/'). For example, for the URL "http://www.website.com/api/example/test", "api", "example", and "test" are URL parts. As used herein, a parameter is a URL part that is expected to be variable. As used herein, an endpoint of a web service refers to an entry point of the web service that is associated with a particular functionality of the web service (e.g., an application programming interface (API) or web site). An endpoint may be represented using a URL or a URL pattern (e.g., if the endpoint includes a parameter).

FIG. 1 is a block diagram of a system and method for performing automatic endpoint discovery, according to some embodiments.

As shown in the diagram, the system includes a proxy 120 that is communicatively coupled between web service clients 110 and a web service server 130. The proxy 120 is also communicatively coupled to a traffic profiler 140.

The web service clients 110 may access a web service implemented by the web service server 130, for example, by generating one or more web server requests (e.g., Hypertext Transfer Protocol (HTTP) request messages such as a "POST" HTTP request messages or "GET" HTTP request messages) and sending these web service requests to the web service server 130. In response to receiving web service requests, the web service servers 130 may send corresponding web server responses (e.g., HTTP response messages) containing the data/content of the web service to the web service clients 110. Each of the web service clients 110 and the web service server 130 may be implemented by a network device.

The proxy 120 may be deployed between the web service clients 110 and the web service server 130 to process traffic being sent between the web service clients 110 and the web service server 130. The proxy 120 may perform various functionality with regard to the traffic such as load balancing, caching, and attack detection. In one embodiment, the proxy 120 is a web application firewall. The proxy 120 may be implemented by one or more network devices.

In one embodiment, when the proxy 120 receives a web service request from a web service client 110, it sends a copy of the web service request to the traffic profiler 140. As will be further described herein, the traffic profiler 140 may analyze the web service requests it receives from the proxy 120 to discover the endpoints of the web service and update the profile of the web service 150 to indicate the discovered endpoints. For example, the traffic profiler 140 may perform an endpoint discovery method 160 to discover the endpoints of the web service. The endpoint discovery method 160 may involve operations 170, 175, 180, 185, 190, and 195. At operation 170, the traffic profiler 140 receives web service requests (that were originated by the web service clients 110 and intended for the web service server 130) from the proxy 120. At operation 175, the traffic profiler 140 determines the levels of similarities between the web service requests. In one embodiment, the traffic profiler 140 determines that web service requests are more similar if: (1) their URL paths have the same URL parts in the same locations; (2) their URL paths have URL parts with the same length or type (e.g., number, universally unique identifier (UUID), date, word in the English dictionary, etc.); (3) their URL paths have the same number of URL parts; (4) they have the same or similar parameters in the POST body and/or query string; (5) they have the same or similar headers (or their corresponding web service responses have the same or similar headers); and/or (6) they have the same or similar response body and/or parameters in their corresponding web service responses.

At operation 180, the traffic profiler 140 groups the web service requests based on the levels of similarities (e.g., such that web service requests that are determined to be more similar are grouped into the same group while web service requests that are determined to be less similar are grouped into different groups). In one embodiment, the traffic profiler 140 uses a clustering algorithm to group the web service requests into groups according to similarity. For example, the traffic profiler 140 may use density-based spatial clustering of applications with noise (DBSCAN) (or other type of clustering algorithm that does not require pre-defining the number of clusters) to group similar web service requests into groups.

At operation 185, the traffic profiler 140 determines, for each group of web service requests, whether the URL paths of the web service requests included in that group include a parameter. In one embodiment, the traffic profiler 140 determines whether the URL paths of the web service requests included in a group include a parameter based on: (1) the number of distinct URL paths of the web service requests included in the group (e.g., a higher number of distinct URL paths indicates that the URL paths are more likely to include a parameter); (2) the ratio between the number of distinct URL paths of the web service requests included in the group and the overall number of web service requests included in the group (e.g., a higher ratio indicates that the URL paths are less likely to include a parameter); (3) the existence of certain types of values that are commonly used as parameters (e.g., number, UUID, date, etc., which may be detected using regular expressions or similar techniques) in the URL paths of the web service requests included in the group; and/or (4) the size of the group over time (e.g., an increase in the size of the group over time indicates that the URL paths are more likely to include a parameter).

If the traffic profiler 140 determines that the URL paths of the web service requests included in a group does not include a parameter, then it may designate each of those URL paths as referring to a separate endpoint.

Otherwise, if the traffic profiler 140 determines that the URL paths of the web service requests included in the group includes one or more parameters, then the traffic profiler 140 determines that these URL paths all refer to the same endpoint (but specify different parameter values). At operation 190, the traffic profiler 140 detects the parameters (e.g., the locations and types of the parameters). In one embodiment, the traffic profiler 140 detects parameters based on identifying the variable parts within the URL paths. The traffic profiler 140 may then generate a URL path pattern representing those URLs. The URL path pattern may indicate the locations of the parameters and the types of the parameters. For example, FIG. 2 illustrates a URL path pattern representing a group of URL paths. In the example shown in FIG. 2, the URL paths 210 are determined to include two parameters (the fourth URL part and the sixth URL part) and it is determined that both of these parameters are numbers. Thus, these URL paths 210 are determined to be referring to the same endpoint. These URL paths 210 may be represented using URL path pattern 220 ("/api/v1/account/{NUMBER}/sites/{NUMBER}", where {NUMBER} indicates a number type parameter).

Returning to FIG. 1, at operation 195, the traffic profiler 140 updates the profile of the web service 150 to indicate the discovered endpoints (e.g., by updating the profile 150 to include the URL paths and/or URL path patterns that are determined to be referring to endpoints of the web service).

While a certain configuration of components is shown in the diagram to illustrate a particular embodiment, other embodiments may use a different configuration than shown in the diagram. For example, in one embodiment, the traffic profiler 140 may be integrated into the proxy 120 instead of being external to the proxy 120. Embodiments may be implemented using additional or fewer components than shown in the diagram. For example, in one embodiment, a proxy 120 is not required so long as there is some other appliance that has visibility into the web service requests being sent to the web service server 130 and that can provide information about the web service requests to the traffic profiler 140. In one embodiment, the traffic profiler 140 profiles network traffic based on analyzing website logs (e.g., offline analysis). Also, while an embodiment is described for generating a profile for a single web service. the techniques used herein can be used to generate profiles for multiple web services (for each web service that the proxy 120 protects).

Figure 3:
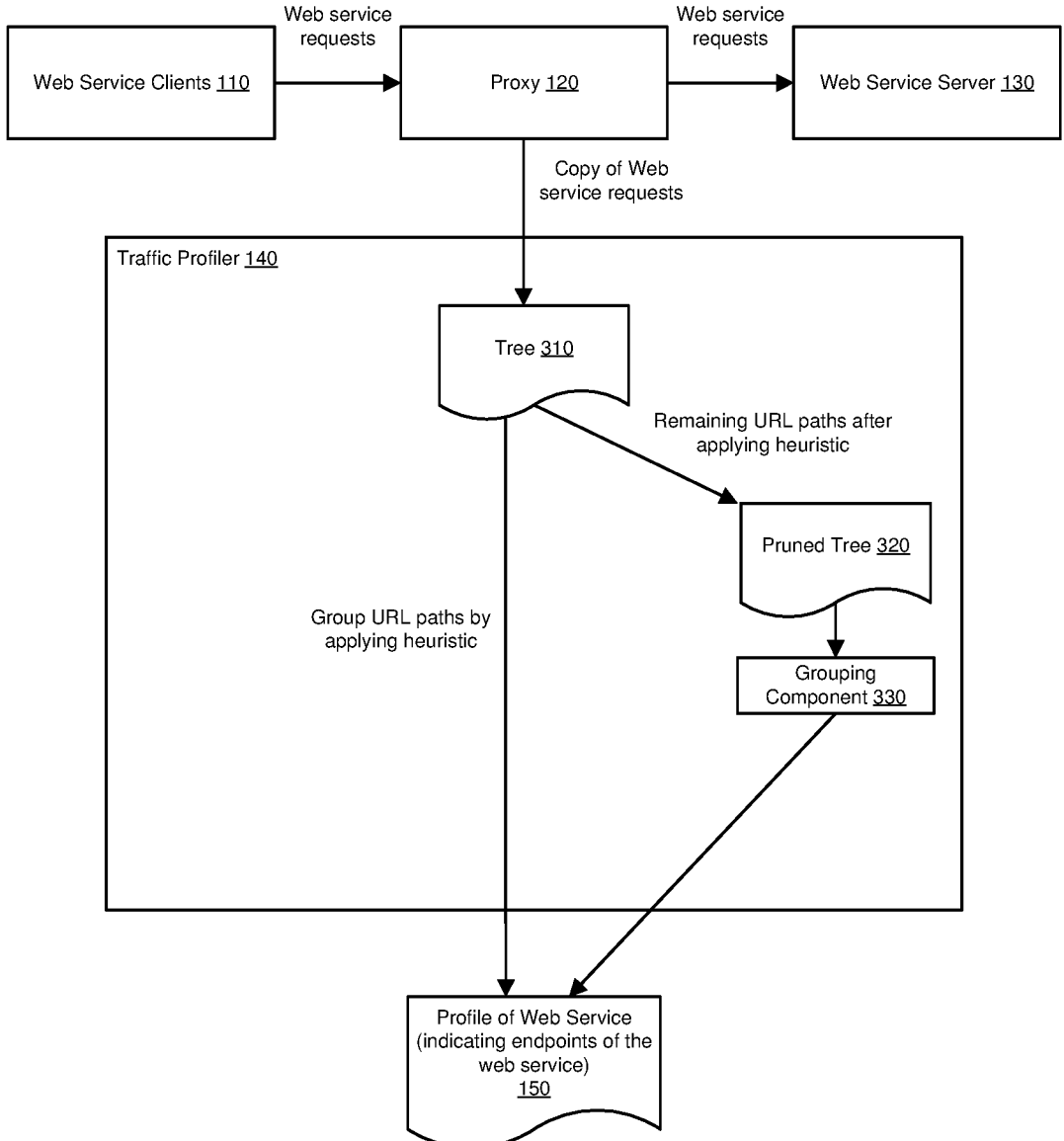
FIG. 3 is a block diagram of a system for performing automatic endpoint discovery using a tree data structure, according to some embodiments.

FIG. 3 is a block diagram of a system for performing automatic endpoint discovery using a tree data structure, according to some embodiments. The system includes similar components as the system shown in FIG. 1.

In one embodiment, the traffic profiler 140 maintains a tree data structure 310 (simply referred herein as "tree") representing the URL paths of the web service requests it receives from the proxy 120. As will be described in additional detail herein, the tree 310 serves as a data structure for maintaining information about the incoming web service requests and also as a basis for a heuristic for grouping URL paths.

The traffic profiler 140 may apply a heuristic to the tree 310 to group the URL paths of the web service requests into groups (groups of similar URL paths). The traffic profiler

140 may then prune the tree 310 (e.g., by merging nodes of the tree) to generate a pruned tree 320 representing the URL paths that could not be grouped using the heuristic. The traffic profiler 140 may then provide the pruned tree 320 to a grouping component 330. The grouping component 330 may use the pruned tree 320 to group URL paths that could not be grouped using the heuristic into groups. The traffic profiler 140 may use the groups formed by the heuristic and/or the grouping component 330 to discover endpoints of the web service.

Figure 4:
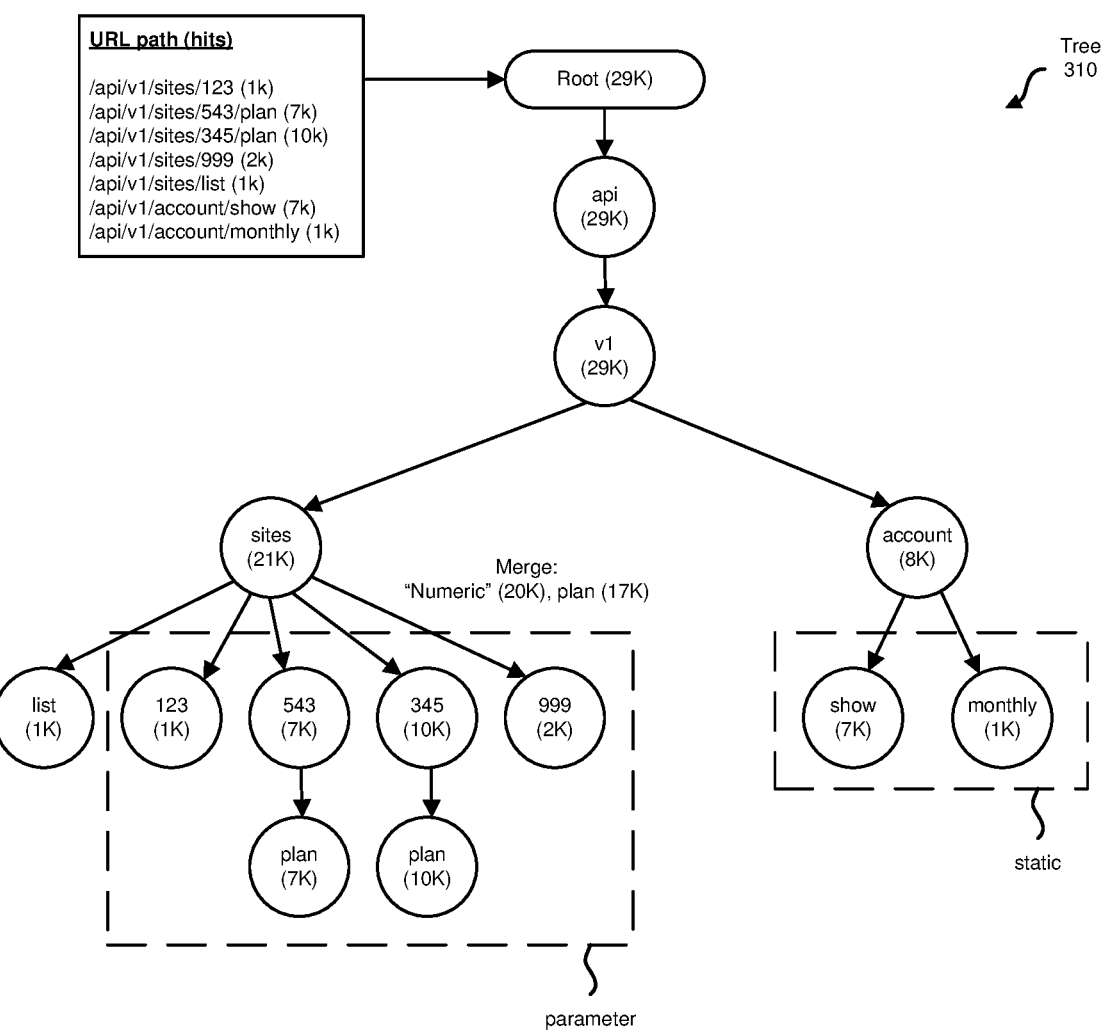
FIG. 4 is a diagram illustrating a tree data structure representing URL paths, according to some embodiments.

FIG. 4 is a diagram illustrating a tree data structure representing URL paths, according to some embodiments.

The tree 310 conveys information regarding the distinct URL paths that have been seen in the web service requests and the counts (also referred to as "hits") per distinct URL path (e.g., the number of web service requests having the URL path). The tree 310 includes a root node representing the web service. Each node stemming from the root node represents a URL part. Each layer of the tree 310 corresponds to a location within a URL path.

In one embodiment, a URL path is added to the tree 310 in the following manner:

1) The URL path is split into URL parts using forward slash '/' as a delimiter and converted to a sub-tree, where each level has exactly one node;

2) The sub-tree is added to the tree 310 while retaining the original levels (e.g., the node in the first level of the sub-tree is added to the first level of the tree 310, the node in the second level of the sub-tree is added to the second level of the tree 310, and so on);

3) If a node of the sub-tree already exists in the tree 310 and has the same parent, then the count of the existing node in the tree 310 is updated to reflect this and the newly added node is deleted;

4) Counts are updated; and

5) A heuristic is applied to the tree to determine nodes that represent a static URL part and/or nodes that represent a parameter. When a parameter is detected, (i) the nodes representing the parameter are merged into a single node and counts updated; and (ii) similar child nodes are merged and counts are updated.

Figure 5:
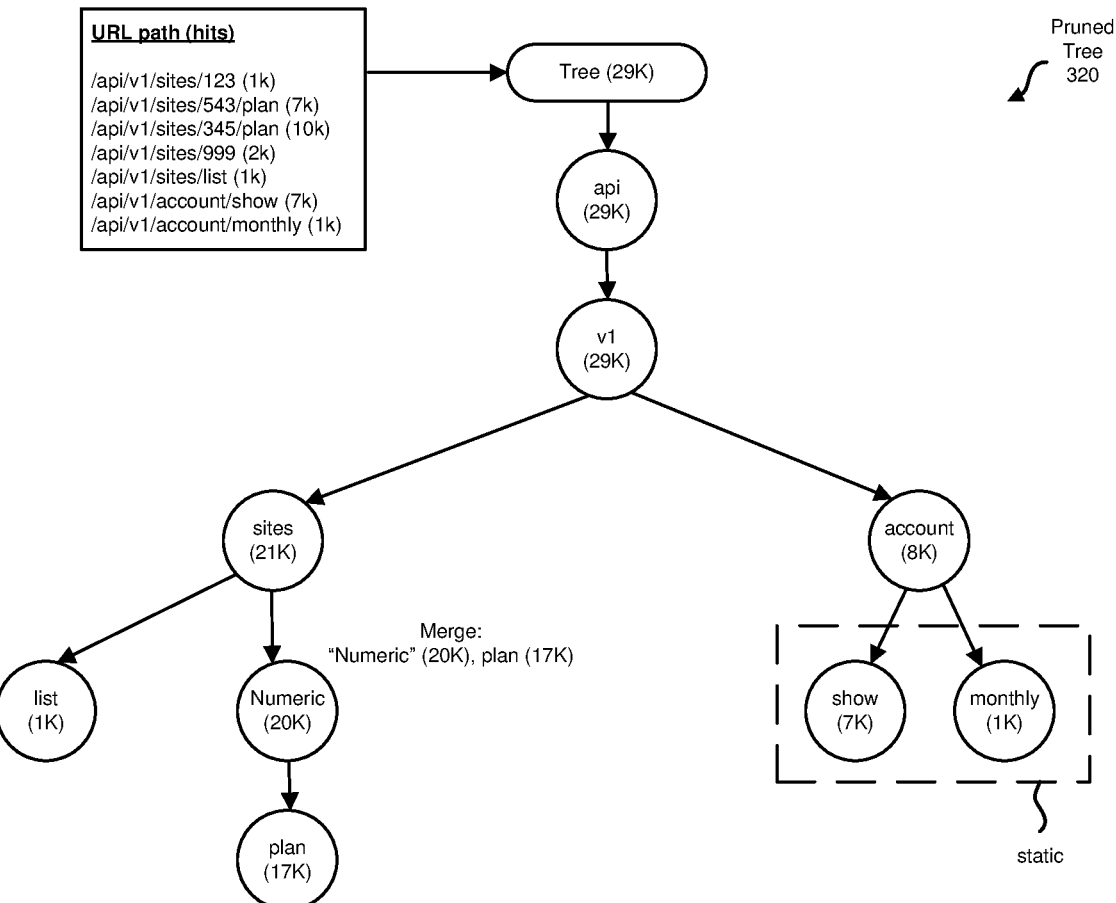
FIG. 5 is a diagram illustrating a pruned tree, according to some embodiments.

For example, in the example shown in the diagram, the heuristic may determine that URL parts "123", "543", "345", and "999" are parameters (they are parameter values for the same parameter). As such, as shown in the pruned tree 320 in FIG. 5, the nodes representing these URL parts are merged into a single node (the node labeled "Numeric"). The count for this node is set to be the sum of the counts of the merged nodes (20K in this example). Also, the child nodes representing URL part "plan" are merged into a single node. The count for this node is set to be the sum of the counts of the merged nodes (17K in this example). Also, in this example, the heuristic may determine that the URL parts "show" and "monthly" are static URL parts. Merging operations may help with controlling the tree size, which allows for keeping track of more distinct URL paths.

The heuristic may decide which nodes to merge based on various features/statistics of the tree 310. For example, if there are more than a hundred child nodes stemming from the same parent with sufficiently high counts and a vast majority of them (e.g., 99 percent) represent numbers, then the child nodes representing numbers may be merged together. As another example, if there is a common pattern among child nodes (e.g., numbers, dashes in a string, templates such as social security number or credit card numbers, etc.), then the child nodes having the common pattern may be merged together. A few examples of features/statistics that can be used to make merging decision are provided in Table I below. The table is meant to provide a few examples to help illustrate embodiments, and is not meant to be exhaustive.

TABLE 1

| Statistics/ Feature | Calculation scope | Description |
|---|---|---|
| counts | sub tree | Counts |
| direct children lengths | children | Lengths histogram for all of the node's children |
| total children | sub tree | Number of children (e.g., if the number of unique direct children is very large) |
| num percent | children | Percent of numeric children |
| alpha percent | children | Percent of letters only children |
| identifier percent | children | Percent of identifiers (letters digits and a group of special chars). Cannot start with a digit |
| words percent | children | Percent of children which are words in the dictionary, or a group of words with/without separators like underscore |
| tree decision | static/path parameter/none | |

In one embodiment, once there are no more URL paths to process, a certain timeframe passes, or the tree 310 reaches a threshold size, the tree is converted to a distance matrix. The distance matrix may indicate the distance between two URL paths (distance may indicate a level of similarity, where closer distance indicates more similarity and further distance indicates less similarity). The distance between two URL paths may be calculated based on their corresponding path in the tree. This may help quickly calculate the distance between the two URL paths because the identical URL parts between the URL paths can be easily identified, as they share the same nodes. The same or similar features/statistics used for deciding which nodes to merge (e.g., the statistics/ features shown in Table 1) may be used to calculate distances between URL paths. For example, if there is a layer in the tree that only includes nodes representing numbers, the URL paths including those numbers can be considered as being closer in distance (i.e., more similar). The URL paths sent to the distance calculator may have the same tree depth and have at least one common parent. The features/statistics sent to the distance calculator may include parent node statistics, total number of children, counts histogram, and/or length histogram.

While merging decisions in the tree 310 are made for a group of child nodes, in the grouping phase, distances are calculated for pairs of nodes. Using the tree 310 may help detect the more trivial parameters, and thereby allow for larger inputs. Also, using the tree 310 may help reduce central processing unit (CPU) and/or memory complexity and determine features for the clustering phase.

As mentioned above, the grouping component 330 may group URL paths that could not be grouped using the heuristic into groups. This grouping phase may use a main component that operates in two phases—an initial phase and a continuous phase, which are described in further detail below.

Figure 6:
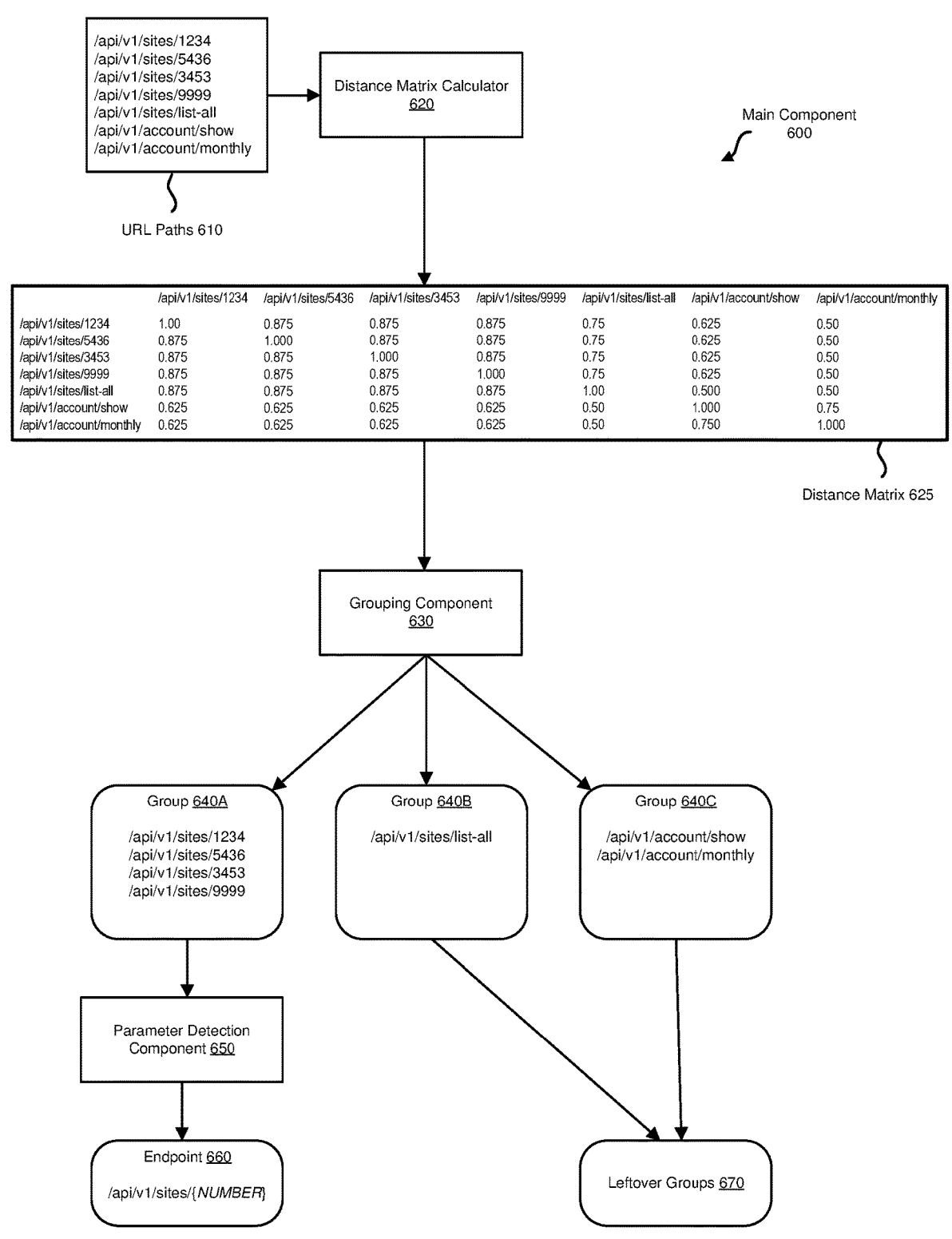
FIG. 6 is a diagram illustrating a main component, according to some embodiments.

FIG. 6 is a diagram illustrating a main component, according to some embodiments. As shown in the diagram, the main component 600 includes a distance matrix calculator 620, a grouping component 630, and a parameter detection component 650. The distance matrix calculator 620 may receive distinct URL paths 610 of incoming traffic to a web service (e.g., web service requests). In one embodiment, the distinct URL paths 610 are received in the form of a tree data structure (e.g., pruned tree 320). The distance matrix calculator 620 may calculate the distance between each pair of URL paths (e.g., as describe herein above) to generate a distance matrix 625. URL paths that do not have the same size (e.g., the same number of URL parts) may be considered far away. Similar URL paths may be considered closer while dissimilar URL paths may be considered further away. URL paths that include the same values or similar values in the same locations may be considered more similar. Two values may be considered to be similar, for example, if they have the same length (e.g., same number of characters), contain only numeric characters or only alphabetic characters, and/or have the same type (e.g., date, UUID, etc.). The distance matrix calculator may provide the distance matrix 625 to the grouping component.

The grouping component 630 may group the URL paths into groups 640 based on the distances included in the distance matrix 625 (e.g., using a clustering algorithm such as DBSCAN). This may result in groups of similar URL paths having the same size (e.g., same number of URL parts), where the differences between the URL paths included in the same group are restricted to a few locations. For example, as shown in the diagram, the grouping component 630 may group the URL paths into group 640A, group 640B, and group 640C.

The parameter detection component 650 may then analyze URL paths included in the same group to determine whether they include a parameter. URL paths that include a parameter are often unique and thus tend to form larger groups, and thus it may be relatively straightforward to detect the parameters in larger groups. For example, the parameter detection component 650 may determine that the URL paths included in group 640A include a parameter and refer to the endpoint 660 of the web service represented by the URL path pattern "/api/vi/sites/{number}". Groups from which an endpoint could not be extracted (e.g., smaller groups such as groups 640B and 640C) may be designated as leftover groups 670. Thus, the main component 600 may return extracted endpoints (e.g., endpoint 660D) and leftover groups (e.g., groups 640B and 640C).

Figure 7:
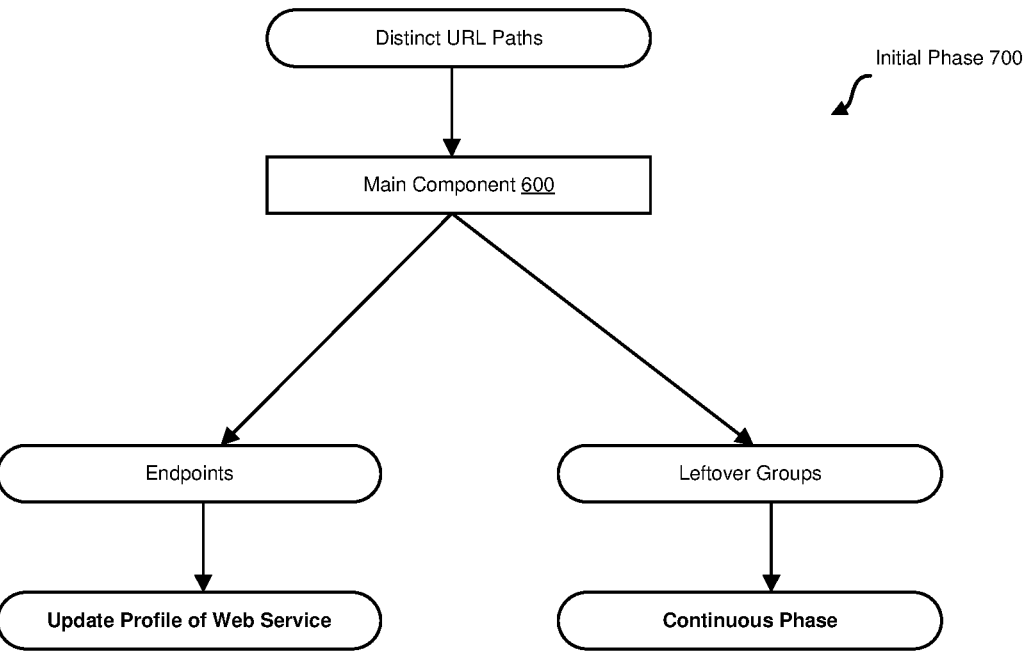
FIG. 7 is a diagram illustrating the initial phase, according to some embodiments.

FIG. 7 is a diagram illustrating the initial phase, according to some embodiments. The initial phase 700 may occur once after a sufficient number of distinct URL paths were sampled from the incoming traffic to the web service. As shown in the diagram, the distinct URL paths may be provided to the main component 600 for processing. The main component 600 may process these URL paths to generate endpoints and leftover groups. The endpoints may be used to update the profile of the web service. The leftover groups may be provided to the continuous phase.

Figure 8:
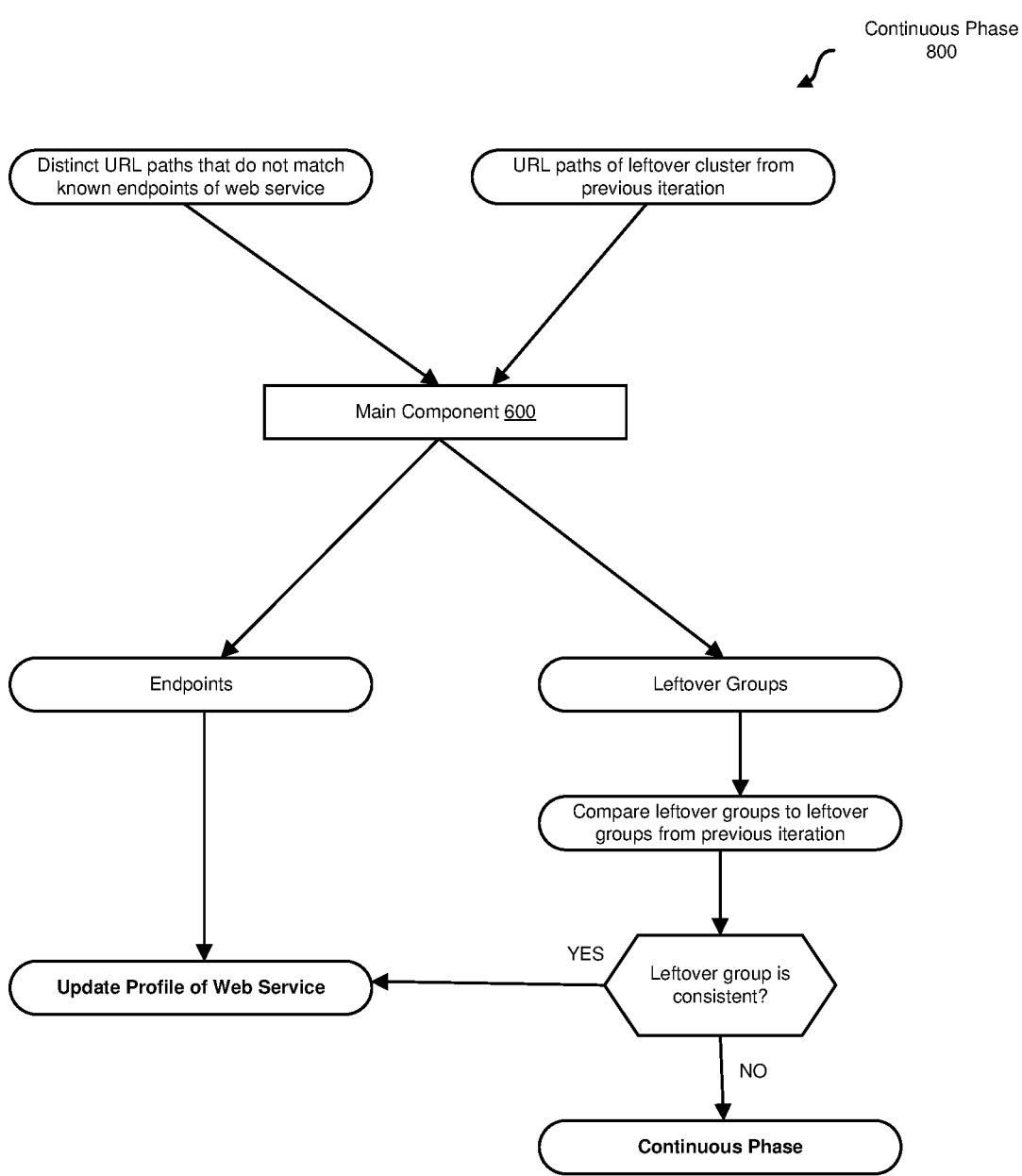
FIG. 8 is a diagram illustrating the continuous phase, according to some embodiments.

FIG. 8 is a diagram illustrating the continuous phase, according to some embodiments. The continuous phase 800 may occur periodically (e.g., every day or after a certain number of distinct URL paths have been seen that do not match already discovered endpoints) after the initial phase occurs. As shown in the diagram, the new distinct URL paths that were seen since the previous iteration (the URL paths that did not match an already discovered endpoint indicated in the profile of the web service) and the URL paths that were included in the leftover groups from the previous iteration are provided to the main component 600 for processing. The main component 600 may process these URL paths to generate new endpoints and leftover groups.

The endpoints may be used to update the profile of the web service. The leftover groups may be further analyzed.

For example, as shown in the diagram, the leftover groups may be compared to the leftover groups from the previous iteration. If any of the leftover groups stays relatively consistent over multiple iterations (e.g., the same URL paths get grouped into the same group for multiple iterations and the size of the group remains virtually the same (no significant number of distinct URL paths are added to the group over multiple iterations)), then this increases the confidence that the URL paths included in the leftover group do not include a parameter (otherwise it is expected that the size of the leftover group would increase over multiple iterations) and thus each of these URL paths may be designated as referring to separate endpoints, and the profile of the web service may be updated to indicate as such. Any leftover groups that do not stay consistent may be saved for the next iteration of the continuous phase. The continuous phase may be repeated using the new leftover groups to possibly discover new endpoints.

FIG. 9 is a flow diagram of a process for automatically discovering endpoints of a web service, according to some embodiments. In one embodiment, the process is implemented by one or more computing devices. The process may be implemented using hardware, software, firmware, or any combination thereof.

The operations in the flow diagrams are described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Also, while the flow diagrams in the figures show a particular order of operations performed by certain embodiments, it should be understood that such order is provided merely as an example (other embodiments may perform the operations in a different order, combine certain operations, overlap certain operations, etc.).

At block 910, the one or more computing devices obtain a plurality of web service requests originated by one or more web service clients to access a web service provided by a web service server.

At block 920, the one or more computing devices determine levels of similarities between pairs of web service requests in the plurality of web service requests. In one embodiment, the levels of similarities are determined based on one or more of: whether URL paths of a pair of web service requests include a same URL part in a same location, whether URL paths of a pair of web service requests include URL parts having a same length or type in a same location, whether URL paths of a pair of web service requests include a same number of URL parts, whether a pair of web service requests include a same or similar post body or query string, whether a pair of web service requests include a same or similar header, and whether a pair of web service requests include a same or similar parameter.

At block 930, the one or more computing devices group the plurality of web service requests into a plurality of groups based on the levels of similarities, wherein the plurality of groups includes at least a first group and a second group. In one embodiment, the plurality of web service requests are grouped into a plurality of groups using a clustering algorithm (e.g., DBSCAN). In one embodiment, the operations of block 920 (determining levels of similarities) and block 930 (grouping web service requests) are performed based on generating and analyzing a tree data structure representing URL paths such as the tree data structures shown in FIGS. 4 and 5.

At block 940, the one or more computing devices determine whether URL paths of web service requests included in the first group include a parameter. In one embodiment, the determination that the URL paths of the web service requests included in the first group do not include a parameter is based on a determination that the first group stays relatively consistent over multiple iterations of grouping.

At block 950, responsive to a determination that the URL paths of the web service requests included in the first group do not include a parameter, the one or more computing devices determine that each of the URL paths of the web service requests included in the first group refer to separate endpoints of the web service.

At block 960, the one or more computing devices determine whether URL paths of web service requests included in the second group include a parameter.

At block 970, responsive to a determination that the URL paths of the web service requests included in the second group include a parameter, the one or more computing devices determine that the URL paths of the web service requests included in the second group refer to a single endpoint of the web service. In one embodiment, the determination that the URL paths of the web service requests included in the second group include a parameter is based on one or more of: a number of distinct URL paths in the URL paths of the web service requests included in the second group, a ratio of the number of distinct URL paths to a number of web service requests included in the second group, and an existence of a predefined type of value in the URL paths of the web service requests included in the second group.

At block 980, the one or more computing devices generate a URL path pattern representing the URL paths of the web service requests included in the second group. In one embodiment, responsive to the determination that the URL paths of the web service requests included in the second group include a parameter, the one or more computing devices determine a location of the parameter and a type of the parameter, wherein the URL path pattern indicates the location of the parameter and the type of the parameter.

At block 990, the one or more computing devices update a profile of the web service to indicate that the URL paths of the web service requests included in the first group each represent an endpoint of the web service and the URL path pattern refers to an endpoint of the web service.

FIG. 10 is a flow diagram of a process for automatically discovering endpoints of a web service, according to some embodiments. In one embodiment, the process is implemented by one or more computing devices. The process may be implemented using hardware, software, firmware, or any combination thereof.

At block 1010, the one or more computing devices obtain a plurality of web service requests originated by one or more web service clients to access a web service provided by a web service server.

At block 1020, the one or more computing devices generate a tree representing URL paths of the plurality of web service requests.

At block 1030, the one or more computing devices apply a heuristic to the tree to group URL paths that include a parameter.

At block 1040, the one or more computing devices generate a distance matrix based on the tree.

At block 1050, the one or more computing devices group URL paths into a plurality of groups based on the distance matrix.

At block 1060, for each of the plurality of groups, the one or more computing devices attempts to extract one or more endpoints from the group and if the attempt is successful, updates a profile of the web service to indicate the one or more endpoints, otherwise if the attempt is not successful, designates the group as a leftover group.

At block 1070, the one or more computing devices obtain a second plurality of web service requests originated by the one or more web service clients to access the web service provided by the web service server.

At block 1080, the one or more computing devices group URL paths of the second plurality of web service requests that do not match endpoints indicated by the profile of the web service and URL paths included in groups designated as leftover groups into a second plurality of groups.

At block 1090, for each of the second plurality of groups, the one or more computing devices attempt to extract one or more endpoints from the group and if the attempt is successful, updates the profile of the web service to indicate the one or more endpoints, otherwise if the attempt is not successful, designates the group as a leftover group. In one embodiment, each URL path included in a group is designated as referring to an endpoint of the web service if the group stays relatively consistent over multiple iterations of grouping.

Figure 11:
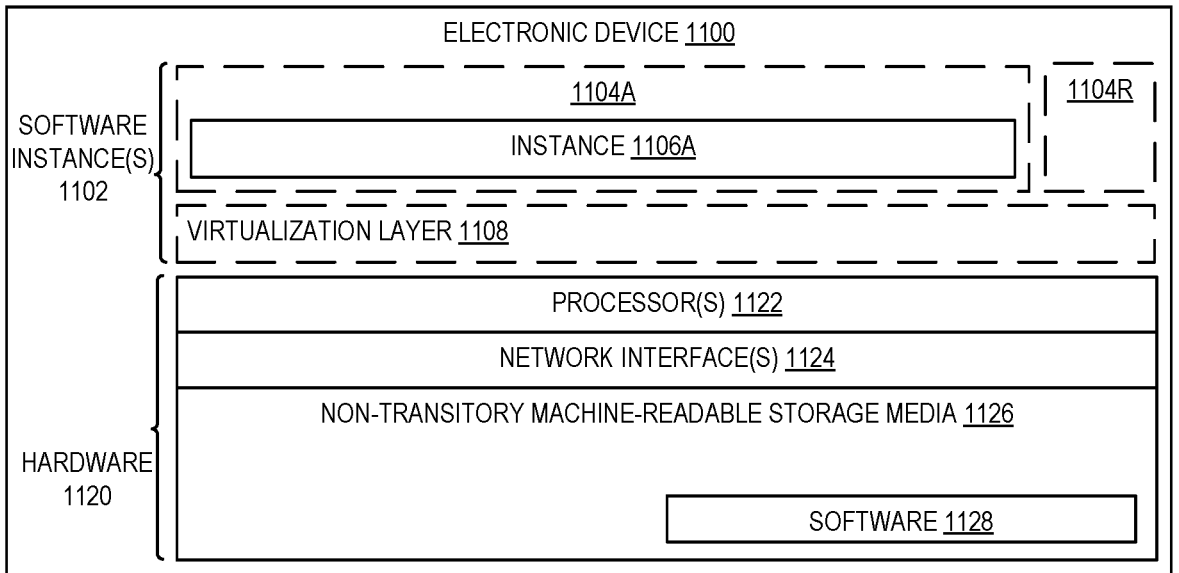
FIG. 11 is a block diagram illustrating an electronic device, according to some embodiments.

FIG. 11 is a block diagram illustrating an electronic device, according to some embodiments. FIG. 11 illustrates hardware 1120 comprising a set of one or more processor(s) 1122, a set of one or more network interfaces 1124 (wireless and/or wired), and non-transitory machine-readable storage medium/media 1126 having stored therein software 1128 (which includes instructions executable by the set of one or more processor(s) 1122). Software 1128 can include code, which when executed by hardware 1120, causes the electronic device 1100 to perform operations of one or more embodiments described herein (e.g., operations for automatically discovering endpoints of a web service). The web service clients 110, the proxy 120, the web service server 130, and/or the traffic profiler 140 may each be implemented by one or more electronic/network devices.

In electronic devices that use compute virtualization, the set of one or more processor(s) 1122 typically execute software to instantiate a virtualization layer 1108 and software container(s) 1104A-R (e.g., with operating system-level virtualization, the virtualization layer 1108 represents the kernel of an operating system (or a shim executing on a base operating system) that allows for the creation of multiple software containers 1104A-R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1128 (illustrated as instance 1106A) is executed within the software container 1104A on the virtualization layer 1108. In electronic devices where compute virtualization is not used, the instance 1106A on top of a host operating system is executed on the "bare metal" electronic device 1100. The instantiation of the instance 1106A, as well as the virtualization layer 1108 and software containers 1104A-R if implemented, are collectively referred to as software instance(s) 1102.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims (or example embodiments). For example, while embodiments have been primarily described in terms of URL paths, some embodiments may apply a similar technique to other types of structured names/addresses. The description is thus to be regarded as illustrative instead of limiting.

What is claimed is:

1. A method performed by one or more computing devices to automatically discover endpoints of a web service, the one or more computing devices being connected between a web service server and one or more web service clients, the method comprising:

deploying a proxy between the one or more web service clients and the web service server to perform attack detection for traffic being sent between the one or more web service clients and the web service server, wherein performing the attack detection comprises:

obtaining a plurality of web service requests originated by the one or more web service clients to access the web service provided by the web service server;

determining levels of similarities between pairs of web service requests in the plurality of web service requests based on whether a pair of web service requests generate a same or similar response body in their corresponding web service responses;

grouping, by executing a clustering algorithm, the plurality of web service requests into a plurality of groups based on the levels of similarities, wherein the plurality of groups includes at least a first group and a second group, wherein each URL path in the first group exhibits higher similarity with other URL paths in the first group as compared to URL paths in the second group;

determining whether uniform resource locator (URL) paths of web service requests included in the first group include a parameter by analyzing the URL paths within the first group, wherein determining comprises applying a heuristic to a tree data structure representing the URL paths of the web service requests in the first group to determine common pattern among the URL paths of web service requests included in the first group, wherein the tree data structure comprises a root node representing the web service, and each node stemming from the root node represents a URL part of the URL paths;

responsive to a determination that the URL paths of the web service requests included in the first group do not include the parameter, determining that each of the URL paths of the web service requests included in the first group refers to a separate end point of the web service;

determining whether URL paths of web service requests included in the second group include a parameter;

responsive to a determination that the URL paths of the web service requests included in the second group include the parameter:

determining that the URL paths of the web service requests included in the second group refer to a single endpoint of the web service, and determining a location of the parameter and a type of the parameter in the URL paths;

generating a URL path pattern representing the location of the parameter and the type of the parameter for the URL paths of the web service requests included in the second group;

updating a profile of the web service to indicate that the URL paths of the web service requests included in the first group each represent an endpoint of the web service and the URL path pattern refers to an endpoint of the web service; and performing the attack detection based on the updated profile, wherein performing the attack detection based on the updated profile comprises discovering the end points of the web service accurately as compared to conventional endpoint discovery solutions, wherein the end points of the web service are discovered by updating the profile to include the URL paths of the web service requests and/or the URL path pattern that are determined to be referred to the endpoints of the web service.

14

2. The method of claim 1, wherein the levels of similarities are further determined based on one or more of:

whether URL paths of a pair of web service requests include a same URL part in a same location, whether URL paths of a pair of web service requests include URL parts having a same length or type in a same location, and whether URL paths of a pair of web service requests include a same number of URL parts.

3. The method of claim 2, wherein the levels of similarities are further determined based on one or more of:

whether a pair of web service requests include a same or similar post body or query string, whether a pair of web service requests generate a same or similar parameter in their corresponding web service responses, whether a pair of web service requests or their corresponding web service responses include a same or similar header, and whether a pair of web service requests include a same or similar parameter.

4. The method of claim 1, wherein the clustering algorithm is a density-based spatial clustering of applications with noise (DBSCAN) algorithm.

5. The method of claim 1, wherein the determination that the URL paths of the web service requests included in the second group include the parameter is based on one or more of: a number of distinct URL paths in the URL paths of the web service requests included in the second group, a ratio of the number of distinct URL paths to a number of web service requests included in the second group, and an existence of a predefined type of value in the URL paths of the web service requests included in the second group.

6. The method of claim 1, wherein the determination that the URL paths of the web service requests included in the first group do not include the parameter is based on a determination that the first group stays relatively consistent over multiple iterations of grouping.

7. A method performed by one or more computing devices to automatically discover endpoints of a web service, the one or more computing devices being connected between a web service server and one or more web service clients, the method comprising:

deploying a proxy between the one or more web service clients and the web service server to perform attack detection for traffic being sent between the one or more web service clients and the web service server, wherein performing the attack detection comprises:

obtaining a plurality of web service requests originated by the one or more web service clients to access the web service provided by the web service server;

generating a tree data structure representing uniform resource locator (URL) paths of the plurality of web service requests, wherein the tree data structure comprises a root node representing the web service, and each node stemming from the root node represents a URL part of the URL paths;

applying a heuristic to the tree data structure to group URL paths that include a parameter;

pruning the tree data structure by merging nodes based on a result of applying the heuristic to generate a pruned tree data structure;

generating a distance matrix based on the pruned tree data structure, the distance matrix indicating distances between the URL paths of the plurality of web service requests;

grouping, by executing a clustering algorithm, URL paths into a plurality of groups based on the distance matrix, wherein each URL path in a group of the plurality of groups exhibits higher similarity with other URL paths within the same group than as compared to URL paths in other groups of the plurality of groups;

for each of the plurality of groups, attempting to extract one or more endpoints from the group and if the attempt is successful, updating a profile of the web service to indicate the one or more endpoints, otherwise if the attempt is not successful, designating the group as a leftover group; and performing the attack detection based on the updated profile, wherein performing the attack detection based on the updated profile comprises discovering the end points of the web service accurately as compared to conventional endpoint discovery solutions, wherein the end points of the web service are discovered by updating the profile to include the URL paths of the web service requests and/or the URL path pattern that are determined to be referred to the endpoints of the web service.

8. The method of claim 7, further comprising:

obtaining a second plurality of web service requests originated by the one or more web service clients to access the web service provided by the web service server;

grouping URL paths of the second plurality of web service requests that do not match endpoints indicated by the profile of the web service and URL paths included in groups designated as leftover groups into a second plurality of groups; and for each of the second plurality of groups, attempting to extract one or more endpoints from the group and if the attempt is successful, updating the profile of the web service to indicate the one or more endpoints, otherwise if the attempt is not successful, designating the group as a leftover group.

9. The method of claim 8, wherein each URL path included in a group is designated as referring to an endpoint of the web service if the group stays relatively consistent over multiple iterations of grouping.

10. A set of one or more non-transitory machine-readable storage media storing instructions which, when executed by one or more processors of one or more computing devices, causes the one or more computing devices to perform operations for automatically discovering endpoints of a web service, the one or more computing devices being connected between a web service server and one or more web service clients, the operations comprising: deploying a proxy between the one or more web service clients and the web service server to perform attack detection for traffic being sent between the one or more web service clients and the web service server, wherein performing the attack detection comprises: obtaining a plurality of web service requests originated by the one or more web service clients to access the web service provided by the web service server;

determining levels of similarities between pairs of web service requests in the plurality of web service requests based on whether a pair of web service requests generate a same or similar response body in their corresponding web service responses;

grouping, by executing a clustering algorithm, the plurality of web service requests into a plurality of groups based on the levels of similarities, wherein the plurality of groups includes at least a first group and a second group, wherein each URL path in the first group exhibits higher similarity with other URL paths in the first group as compared to URL paths in the second group;

determining whether uniform resource locator (URL) paths of web service requests included in the first group include a parameter by analyzing the URL paths within the first group, wherein determining comprises applying a heuristic to a tree data structure representing the URL paths of the web service requests in the first group to determine common pattern among the URL paths of web service requests included in the first group, wherein the tree data structure comprises a root node representing the web service, and each node stemming from the root node represents a URL part of the URL paths;

responsive to a determination that the URL paths of the web service requests included in the first group do not include the parameter, determining that each of the URL paths of the web service requests included in the first group refers to a separate end point of the web service;

determining whether URL paths of web service requests included in the second group include a parameter;

responsive to a determination that the URL paths of the web service requests included in the second group include the parameter:

determining that the URL paths of the web service requests included in the second group refer to a single endpoint of the web service, and determining a location of the parameter and a type of the parameter in the URL paths;

generating a URL path pattern representing the location of the parameter and the type of the parameter for the URL paths of the web service requests included in the second group;

updating a profile of the web service to indicate that the URL paths of the web service requests included in the first group each represent an endpoint of the web service and the URL path pattern refers to an endpoint of the web service; and performing the attack detection based on the updated profile, wherein performing the attack detection based on the updated profile comprises discovering the end points of the web service accurately as compared to conventional endpoint discovery solutions, wherein the end points of the web service are discovered by updating the profile to include the URL paths of the web service requests and/or the URL path pattern that are determined to be referred to the endpoints of the web service.

11. The set of one or more non-transitory machine-readable storage media of claim 10, wherein the levels of similarities are further determined based on one or more of:

whether URL paths of a pair of web service requests include a same URL part in a same location, whether URL paths of a pair of web service requests include URL parts having a same length or type in a same location, and whether URL paths of a pair of web service requests include a same number of URL parts.

12. The set of one or more non-transitory machine-readable storage media of claim 10, wherein the determination that the URL paths of the web service requests included in the second group include the parameter is based on one or more of: a number of distinct URL paths in the URL paths of the web service requests included in the second group, a ratio of the number of distinct URL paths to a number of web service requests included in the second group, and an existence of a predefined type of value in the URL paths of the web service requests included in the second group.

13. A set of one or more non-transitory machine-readable storage media storing instructions which, when executed by one or more processors of one or more computing devices, causes the one or more computing devices to perform operations for automatically discovering endpoints of a web service, the one or more computing devices being connected between a web service server and one or more web service clients, the operations comprising:

deploying a proxy between the one or more web service clients and the web service server to perform attack detection for traffic being sent between the one or more web service clients and the web service server, wherein performing the attack detection comprises:

obtaining a plurality of web service requests originated by the one or more web service clients to access the web service provided by the web service server;

generating a tree data structure representing uniform resource locator (URL) paths of the plurality of web service requests, wherein the tree data structure comprises a root node representing the web service, and each node stemming from the root node represents a URL part of the URL paths;

applying a heuristic to the tree data structure to group URL paths that include a parameter;

pruning the tree data structure by merging nodes based on a result of applying the heuristic to generate a pruned tree data structure;

generating a distance matrix based on the pruned tree data structure, the distance matrix indicating distances between the URL paths of the plurality of web service requests;

grouping, by executing a clustering algorithm, URL paths into a plurality of groups based on the distance matrix, wherein each URL path in a group of the plurality of groups exhibits higher similarity with other URL paths within the same group as compared to URL paths in other groups of the plurality of groups;

for each of the plurality of groups, attempting to extract one or more endpoints from the group and if the attempt is successful, updating a profile of the web service to indicate the one or more endpoints, otherwise if the attempt is not successful, designating the group as a leftover group; and performing the attack detection based on the updated profile, wherein performing the attack detection based on the updated profile comprises discovering the end points of the web service accurately as compared to conventional endpoint discovery solutions, wherein the end points of the web service are discovered by updating the profile to include the URL paths of the web service requests and/or the URL path pattern that are determined to be referred to the endpoints of the web service.

14. The set of one or more non-transitory machine-readable storage media of claim 13, wherein the operations further comprise:

obtaining a second plurality of web service requests originated by the one or more web service clients to access the web service provided by the web service server;

grouping URL paths of the second plurality of web service requests that do not match endpoints indicated by the profile of the web service and URL paths included in groups designated as leftover groups into a second plurality of groups; and for each of the second plurality of groups, attempting to extract one or more endpoints from the group and if the attempt is successful, updating the profile of the web service to indicate the one or more endpoints, otherwise if the attempt is not successful, designating the group as a leftover group.

15. The set of one or more non-transitory machine-readable storage media of claim 14, wherein each URL path included in a group is designated as referring to an endpoint of the web service if the group stays relatively consistent over multiple iterations of grouping.

16. A computing device configured to detect endpoints of a web service, the computing device being connected between a web service server and one or more web service clients, the computing device comprising:

one or more processors; and a non-transitory machine-readable storage medium having instructions stored therein, which when executed by the one or more processors, causes the computing device to deploy a proxy between the one or more web service clients and the web service server to perform attack detection for traffic being sent between the one or more web service clients and the web service server, wherein, to perform the attack detection, the computing device is caused to:

obtain a plurality of web service requests originated by the one or more web service clients to access the web service provided by the web service server;

determine levels of similarities between pairs of web service requests in the plurality of web service requests based on whether a pair of web service requests generate a same or similar response body in their corresponding web service responses;

group, by executing a clustering algorithm, the plurality of web service requests into a plurality of groups based on the levels of similarities, wherein the plurality of groups includes at least a first group and a second group, wherein each URL path in the first group exhibits higher similarity with other URL paths in the first group than as compared to URL paths in the second group;

determine whether uniform resource locator (URL) paths of web service requests included in the first group include a parameter by analyzing the URL paths within the first group, wherein the computing device is caused to apply a heuristic to a tree data structure representing the URL paths of the web service requests in the first group to determine common pattern among the URL paths of web service requests included in the first group, wherein the tree data structure comprises a root node representing the web service, and each node stemming from the root node represents a URL part of the URL paths;

responsive to a determination that the URL paths of the web service requests included in the first group do not include the parameter, determine that each of the URL paths of the web service requests included in the first group refers to a separate end point of the web service;

determine whether URL paths of web service requests included in the second group include a parameter;

responsive to a determination that the URL paths of the web service requests included in the second group include the parameter:

determine that the URL paths of the web service requests included in the second group refer to a single endpoint of the web service, and determine a location of the parameter and a type of the parameter in the URL paths;

generate a URL path pattern representing the location of the parameter and the type of the parameter for the URL paths of the web service requests included in the second group;

update a profile of the web service to indicate that the URL paths of the web service requests included in the first group each represent an endpoint of the web service and the URL path pattern refers to an endpoint of the web service; and perform the attack detection based on the updated profile, wherein, to perform the attack detection based on the updated profile, the computing device is caused to discover the end points of the web service accurately as compared to conventional endpoint discovery solutions, wherein the end points of the web service are discovered by updating the profile to include the URL paths of the web service requests and/or the URL path pattern that are determined to be referred to the endpoints of the web service.

17. A computing device configured to detect endpoints of a web service, the computing device being connected between a web service server and one or more web service clients, the computing device comprising:

one or more processors; and a non-transitory machine-readable storage medium having instructions stored therein, which when executed by the one or more processors, causes the computing device to deploy a proxy between the one or more web service clients and the web service server to perform attack detection for traffic being sent between the one or more web service clients and the web service server, wherein, to perform the attack detection, the computing device is caused to:

obtain a plurality of web service requests originated by the one or more web service clients to access the web service provided by the web service server;

generate a tree data structure representing uniform resource locator (URL) paths of the plurality of web service requests, wherein the tree data structure comprises a root node representing the web service, and each node stemming from the root node represents a URL part of the URL paths;

apply a heuristic to the tree data structure to group URL paths that include a parameter;

prune the tree data structure by merging nodes based on a result of applying the heuristic to generate a pruned tree data structure;

generate a distance matrix based on the pruned tree data structure, the distance matrix indicating distances between the URL paths of the plurality of web service requests;

group, by executing a clustering algorithm, URL paths into a plurality of groups based on the distance matrix, wherein each URL path in a group of the plurality of groups exhibits higher similarity with other URL paths within the same group as compared to URL paths in other groups of the plurality of groups;

for each of the plurality of groups, attempt to extract one or more endpoints from the group and if the attempt is successful, update a profile of the web service to indicate the one or more endpoints, otherwise if the attempt is not successful, designate the group as a leftover group; and perform the attack detection based on the updated profile, wherein, to perform the attack detection based on the updated profile, the computing device is caused to discover the end points of the web service accurately as compared to conventional endpoint discovery solutions, wherein the end points of the web service are discovered by updating the profile to include the URL paths of the web service requests and/or the URL path pattern that are determined to be referred to the endpoints of the web service.

* * * * *